(12) United States Patent
Terrasi et al.

(10) Patent No.: US 10,604,449 B2
(45) Date of Patent: Mar. 31, 2020

(54) SELF-PRESTRESSED REINFORCED CONCRETE ELEMENTS

(71) Applicant: EMPA Eidgenössische Materialprüfungs- und Forschungsanstalt, Dübendorf (CH)

(72) Inventors: Giovanni Pietro Terrasi, Riedikon (CH); Mateusz Ryszard Wyrzykowski, Dubendorf (CH); Pietro Lura, Brugg (CH)

(73) Assignee: EMPA EIDGENÖSSISCHE MATERIALPRÜFUNGS- UND FORSCHUNGSANSTALT, Dübendorf (CH)

( * ) Notice: Subject to any disclaimer, the term of this patent is extended or adjusted under 35 U.S.C. 154(b) by 11 days.

(21) Appl. No.: 15/736,350

(22) PCT Filed: Jun. 14, 2016

(86) PCT No.: PCT/CH2016/000089
§ 371 (c)(1),
(2) Date: Dec. 14, 2017

(87) PCT Pub. No.: WO2016/201587
PCT Pub. Date: Dec. 22, 2016

(65) Prior Publication Data
US 2018/0208509 A1 Jul. 26, 2018

(30) Foreign Application Priority Data
Jun. 18, 2015 (EP) ..................................... 15001810

(51) Int. Cl.
| | | |
|---|---|---|
| C04B 28/04 | (2006.01) | |
| C04B 28/02 | (2006.01) | |
| C04B 28/06 | (2006.01) | |
| C04B 28/08 | (2006.01) | |
| C04B 28/10 | (2006.01) | |
| C04B 40/00 | (2006.01) | |
| E04C 5/08 | (2006.01) | |
| E04C 3/26 | (2006.01) | |

(52) U.S. Cl.
CPC .............. *C04B 28/04* (2013.01); *C04B 28/02* (2013.01); *C04B 28/021* (2013.01); *C04B 28/06* (2013.01); *C04B 28/065* (2013.01); *C04B 28/08* (2013.01); *C04B 28/10* (2013.01); *C04B 40/0039* (2013.01); *C04B 40/0042* (2013.01); *C04B 40/0046* (2013.01); *E04C 3/26* (2013.01); *E04C 5/085* (2013.01); *C04B 2201/50* (2013.01); *C04B 2201/52* (2013.01); *Y02W 30/92* (2015.05); *Y02W 30/94* (2015.05)

(58) Field of Classification Search
CPC ..... C04B 28/04; C04B 28/10; C04B 40/0042; C04B 28/065; E04C 5/085
USPC ............................................................ 524/5
See application file for complete search history.

(56) References Cited

U.S. PATENT DOCUMENTS

| | | | |
|---|---|---|---|
| 5,891,374 A * | 4/1999 | Shah .................... | B28B 1/52 264/108 |
| 7,086,849 B1 | 8/2006 | Tazawa et al. | |
| 2003/0144386 A1 | 7/2003 | Pakusch et al. | |
| 2012/0289630 A1 | 11/2012 | Masanaga et al. | |
| 2012/0298012 A1 * | 11/2012 | Berke ................. | C04B 40/0039 106/801 |
| 2015/0232388 A1 * | 8/2015 | Dal Bo ................ | C04B 28/04 106/726 |

FOREIGN PATENT DOCUMENTS

| | | | | |
|---|---|---|---|---|
| CN | 102 173 629 A | | 9/2011 | |
| EP | 1 329 435 A1 | | 7/2003 | |
| EP | 2 716 615 A1 | | 4/2014 | |
| EP | 2716615 A1 * | | 4/2014 | ............ C04B 24/02 |
| JP | S57-145057 A | | 9/1982 | |
| JP | H07-232994 A | | 9/1995 | |
| JP | 2001-048627 A | | 2/2001 | |
| JP | 2007-238439 A | | 9/2007 | |
| JP | 2007238439 A * | | 9/2007 | |
| JP | 2008-230933 A | | 10/2008 | |
| WO | 1999/062843 A1 | | 12/1999 | |
| WO | 2001/002317 A1 | | 1/2001 | |
| WO | 2012/162292 A2 | | 11/2012 | |

OTHER PUBLICATIONS

Translation of JP2007-238439, Sep. 20, 2007. (Year: 2007).*
International Search Report for corresponding International Application No. PCT/CH2016/000089 dated Oct. 24, 2016.
Witten Opinion of the International Searching Authority for corresponding International Application No. PCT/CH2016/000089 dated Oct. 24, 2016.
Yamasaki et al., "Study on the Two-Dimensional Chemical Prestressed Concrete Thin Panel with CFRP Tendon and High Expansive Agent", Non-Metallic (FRP) Reinforcement for Concrete Structures, Proceedings of the Third International Symposium, vol. 2, Oct. 1997, pp. 639-646 (cited in specification on p. 1).

(Continued)

*Primary Examiner* — Hui H Chin
(74) *Attorney, Agent, or Firm* — Renner, Otto, Boisselle & Sklar, LLP

(57) ABSTRACT

The present invention relates to improved concrete elements, particularly to self-prestressed, high-performance concrete elements (SP-HPC elements); to cementitious compositions suitable, for producing such concrete elements; to methods of manufacturing such concrete elements and such cementitious compositions; to the use of specific components in concrete elements and cementitious mixtures. The compositions and elements described herein comprise an effective amount of expansive agents in combination with superabsorbent polymers (SAP) and shrinkage reducing admixtures (SRA), and optional further components as defined in the claims. The present invention further provides for improved tendons, suitable for SP-HPC elements.

13 Claims, 4 Drawing Sheets

(56) References Cited

OTHER PUBLICATIONS

Sugiyama et al., "The Response of a Chemically Prestressed Concrete Beam with Lattice-Form FRP in the Flexural Strength Test", Non-Metallic (FRP) Reinforcement for Concrete Structures, Proceedings of the Third International Symposium, vol. 2, Oct. 1997, pp. 631-638 (cited in specification on p. 2).
Nakayama, "Prevention of crack generation in hardened cement—by addition of poly- or mono-amide and poly-alkylene ether with expanding agent e.g. gypsum", 1982, WPI / Thomson, Sep. 7, 1982, vol. 1982, No. 41, XP002752824.
Cohen et al., "Silica Fume Improves Expansive-Cement Concrete", Concrete International, vol. 13, 1991, pp. 31-37 (cited in specification on p. 8).
Nagataki et al., "Expansive admixtures (mainly ettringite)", Cement and Concrete Composites, vol. 20, 1998, pp. 163-170 (cited in specification on p. 8).

* cited by examiner

SELF-PRESTRESSED REINFORCED CONCRETE ELEMENTS

This application is a national phase of International Application No. PCT/CH2016/000089 filed Jun. 14, 2016, and claims priority to European Application No. 15 001 810.9 filed on Jun. 18, 2015, which is incorporated herein by reference.

The present invention relates to improved concrete elements, particularly to self-prestressed (chemically-prestressed or internally-prestressed, the three terms are used interchangeably herein), high-performance concrete elements (SP-HPC elements); to cementitious compositions suitable for producing such concrete elements; to methods of manufacturing such concrete elements and such cementitious compositions; to the use of specific components in concrete elements and cementitious mixtures. The compositions and elements described herein comprise an effective amount of expansive agents in combination with superabsorbent polymers (SAP) and shrinkage reducing admixtures (SRA), and optional further components. The present invention further provides for improved tendons, suitable for the above SP-HPC elements.

Pre-tensioning of concrete elements is a known technology with a number of problems associated therewith. Concrete elements with improved characteristics and/or simplified manufacturing are highly desirable.

Yamasaki et al (Non-Metallic reinforcement for concrete structures, Proceedings of the $3^{rd}$ international symposium, vol. 2, October, 1997), disclose a study on two-dimensional chemically prestressed concrete thin panel with CFRP tendon and high expansive agent. Although suitable for certain applications, the concrete panels and the manufacturing thereof have certain drawbacks. For example, considerably high shrinkage and creep and insufficient bonding between tendons and concrete ("slippage", FIG. 11) is observed. According to this document, the self-prestress of the tendons is lower than 400 MPa (see FIG. 9: pre-strains of the CFRP tendons (1, 2 or 3) at age 4 weeks vs. unit weight of expansive agent are given). The strains in the CFRP tendons are limited to 2500 micrometer/meter, with an E-Modulus for the tendons of 154 GPa; the resulting prestress at 28 d age is lower than 385 MPa, which is considered insufficient. Finally, it appears that the concrete used for manufacturing these panels is not self-compacting (slump flow 200 mm), making manufacturing more difficult.

Sugiyama et al (Non-Metallic reinforcement for concrete structures, Proceedings of the $3^{rd}$ international symposium, vol. 2, October, 1997), discuss the response of a chemically prestressed concrete beam with lattice-form FRP in the flexural strength test. Although suitable for certain applications, the concrete beams and the manufacturing thereof have certain drawbacks. For example, bonding between lattice and concrete is achieved by lattice intersections interlock. According to this document, the self-prestress of the tendons is below 134 MPa only (see FIG. 2: E-CFRP=152 GPa while for lattice space 15 cm the maximum top CFRP pre-strain is only 882 micrometer/meter), which is considered insufficient. Finally, the concrete used for manufacturing these tendons is not self-compacting (slump flow 150 mm), making manufacturing more difficult.

Berke et al (WO2012/162292) disclose admixtures for shrinkage-crack reduction of Portland cement mortars and concretes. The document discloses admixtures based on MgO as expansive agent (but not CSA-based expansive agents), combined with superabsorbent polymers (SAP) and shrinkage reducing admixtures (SRA). Further, Berke et al. speculate about using other expansive agents, e.g. Calcium oxide, Calcium silicate and Magnesium silicate. Further, Berke et al teach that cracking from expansion occurs already at values around 0.04% (example 1). The compositions disclosed in that document are therefore unsuitable for manufacturing stable and durable self-prestressed reinforced concrete elements.

Hori et al (WO1999062843) disclose production method of chemically prestressed concrete elements containing only expansive agent. According to Hori et al, stable expansion can be obtained only by using high-temperature, high-pressure underwater curing using a special device disclosed in that document.

Thus, it is an object of the present invention to mitigate at least some of these drawbacks of the state of the art. In particular, it is an aim of the present invention to provide improved concrete elements, simple and safe in manufacturing and having properties at least comparable to those concrete elements already available, as well as corresponding cementitious mixtures.

These objectives are achieved by a cementitious mixture as defined in claim 1. Further aspects of the invention are disclosed in the specification and independent claims, preferred embodiments are disclosed in the specification and the dependent claims. This invention provides:

in a first aspect to novel cementitious mixtures;

in a second aspect to the manufacturing of such cementitious mixtures;

in a third aspect to concrete elements based on such cementitious mixtures in a forth aspect to the manufacturing of such concrete elements; and in a fifth aspect to materials suitable as tendons for such concrete elements.

The present invention will be described in more detail below; the relationship between these aspects of the present invention being outlined in FIG. 1.

It is understood that the various embodiments, preferences and ranges as provided/disclosed in this specification may be combined at will. Further, depending on the specific embodiment, selected definitions, embodiments or ranges may not apply.

As used herein, the term "a", "an", "the" and similar terms used in the context of the present invention (especially in the context of the claims) are to be construed to cover both the singular and plural unless otherwise indicated herein or clearly contradicted by the context. As used herein, the terms "including", "containing" and "comprising" are used herein in their open, non-limiting sense.

The present invention will be better understood by reference to the figures.

FIG. 1 schematically shows the various aspects of the present invention, whereas (a) . . . (i) denotes the starting materials of the inventive cementitious compositions, as outlined herein ($1^{st}$) denotes the cementitious mixtures as described in the $1^{st}$ aspect of this invention;

($2^{nd}$) denotes the manufacturing thereof, $2^{nd}$ aspect of this invention;

($3^{rd}$) denotes concrete elements, $3^{rd}$ aspect of this invention, which may be conventional, non-prestressed concrete elements ($3^{rd}$.1), externally prestressed concrete elements ($3^{rd}$.2), or internally prestressed (self-prestressed) concrete elements ($3^{rd}$.3);

($4^{th}$) denotes the manufacturing thereof, $4^{th}$ aspect of the invention and (5$^{th}$) denotes tendons, particularly suitable for internally prestressed (self-prestressed) concrete elements (3$^{rd}$.3).

FIG. 2 provides for a schematic representation of chemical prestress.

A—reinforced element before expansion takes place (stress in the section is zero, $\sigma_0$=0);
B—unreinforced element after unrestrained deformation (stress in the section is zero, $\sigma_{Fr}$=0);
C—reinforced element after restrained expansion, without shrinkage and creep (prestress in the section, $\sigma_{Res}$):
D—reinforced element after restrained expansion, with shrinkage and creep (prestress in the section, $\sigma_{Res-Shr-cr}$);

FIG. 3 shows the effect of using SAP together with CSA-based expansive agents and shrinkage reducing admixture for chemical prestress (a) and for shrinkage reduced (b) HP concretes. Free expansion is shown referenced to the age of 1 day.
A—concrete with no SAP;
B—concrete with SAP.
The horizontal axes show time from casting (days), the vertical axes show strain (micrometer/meter).

FIG. 4 shows the deformations of the MIX I samples prepared according to Table 1; tested on 40×40×160 mm$^3$ prismatic samples stored under water from the age of 1 d until 28 d or later. For the restrained deformations, two reinforcement ratios, r=1.0% and r=2.6%, were obtained with M5 and M8 threaded steel bars, respectively (see Standard JIS A 6202; reinforcing steel 1.4301 with elastic Young modulus of 200 GPa). Each point is the average of three samples. Error bars represent standard deviation.
A—unrestrained deformation, continuously stored under water; B—unrestrained deformation, stored under water until 28 days, later drying at 70% RH; C—restrained deformation with r=1.0%, stored under water until 28 days, later drying at 70% RH; D—restrained deformation with r=2.6%, stored under water until 28 days, later drying at 70% RH. The horizontal axis shows time from casting (days), the vertical axis shows strain (micrometer/meter).

Figure 8:
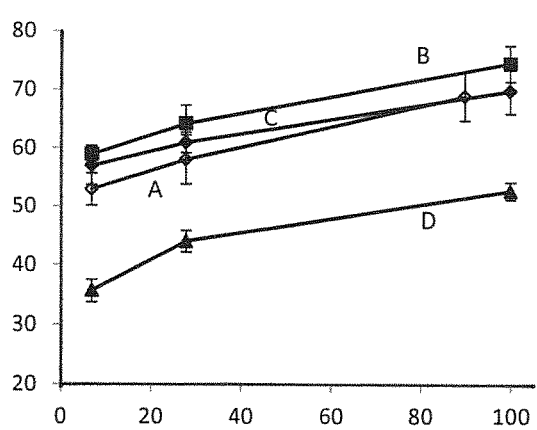

FIG. 8 shows the evolution of compressive strength for MIX I-IV, measured on unrestrained samples continuously stored under water from 1 d. The samples had dimensions 25×25×100 mm$^3$. Each result is the average of two samples. Error bars represent standard deviation. The data shown for Mix I, II, and III are considered "excellent", for Mix IV "good". A—Mix I, B—Mix II, C—Mix III, D—Mix IV. The horizontal axis shows time from casting (days), the vertical axis shows compressive strength (MPa).

Figure 9:
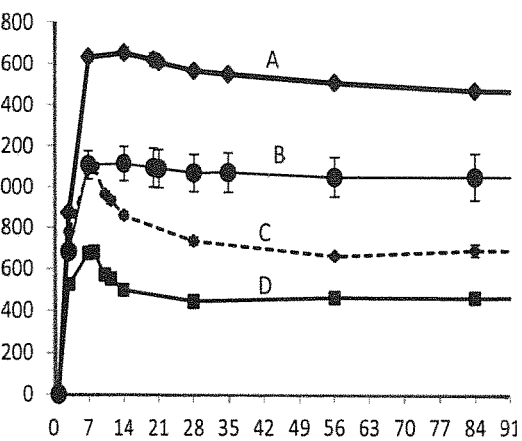

FIG. 9 shows unrestrained deformations of the MIX I (curve A, see Table 1) and samples prepared with removing either SAP (curve B, component (e)) or SRA (curve C, component (f)), or both components (curve D), from the mix design. Tested on 40×40×160 mm$^3$ prismatic samples stored in sealed conditions from demolding at the age of 1 d until 7 d and opened to drying at 70% RH afterwards (unrestrained expansion). The horizontal axis shows time from casting (days), the vertical axis shows strain (micrometer/meter).

Figure 10:
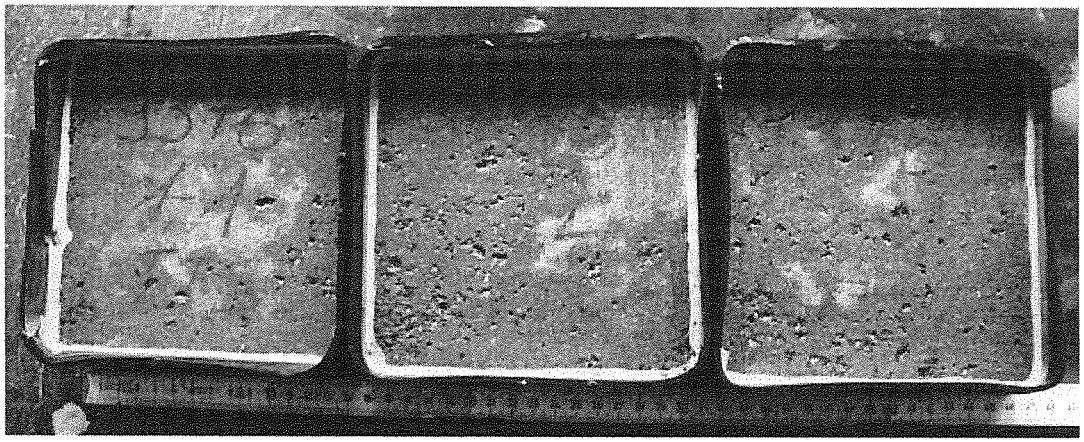

FIG. 10 shows surfaces of unrestrained samples (see free expansion in FIG. 4) exposed to 28 freeze-thaw cycles with de-icing salts (3% NaCl solution) according to SIA 262/1: 2003 (Appendix C). Before the tests the samples were kept under water for 35 days following demolding at 1 day. The mass of scaled-off material was only 39±19 g/m$^2$.

Figure 11:
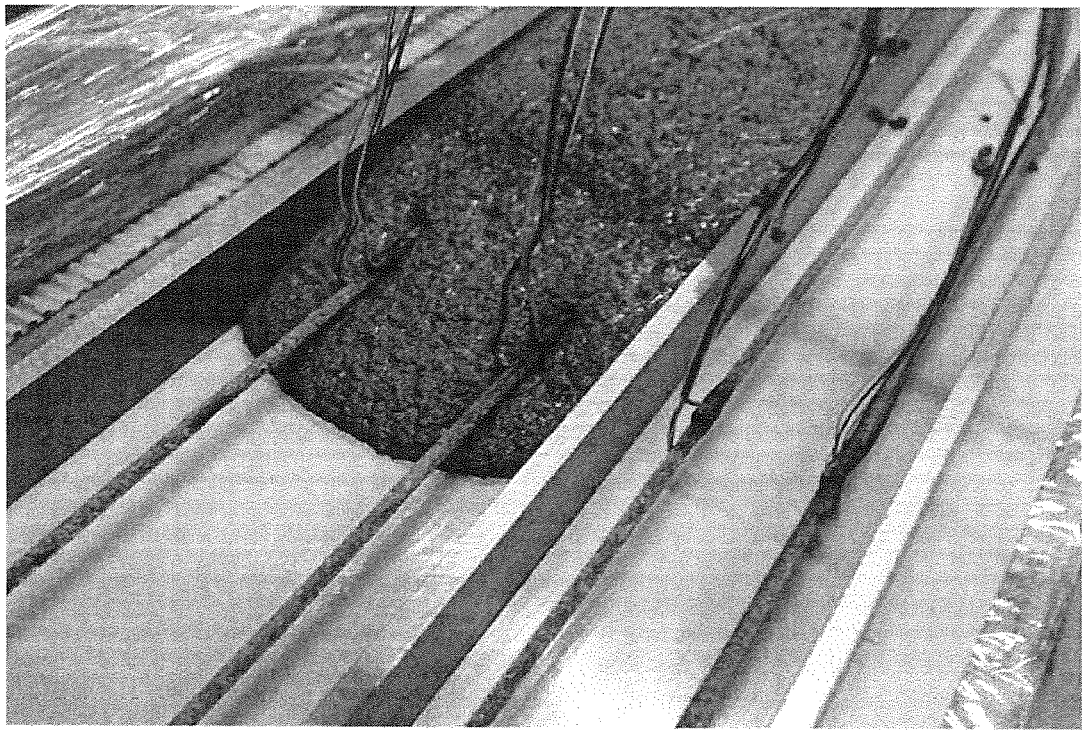

FIG. 11 shows manufacturing of a slab by pouring a self-compacting concrete (Mix V prepared according to Table 1) into a mold with preinstalled CFRP reinforcement. The slab needs to be left hardening until the desired strength and prestress-level is achieved.

Figure 12:
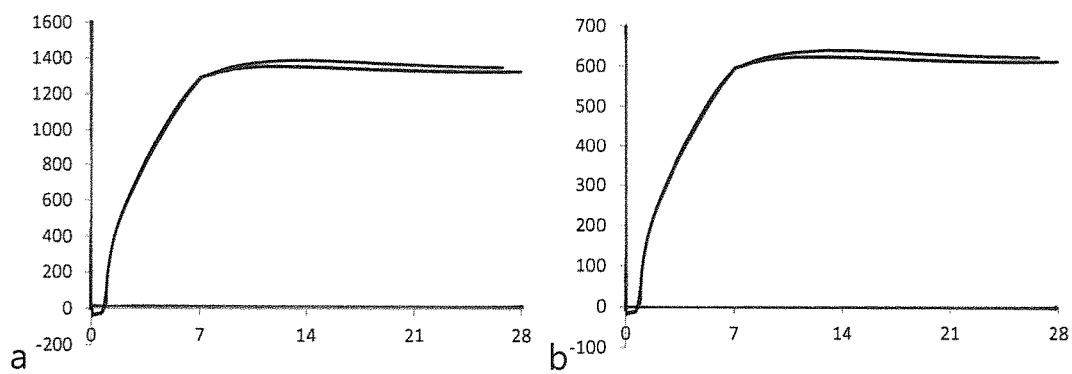

FIG. 12 shows the development of a) average embedded HM CFRP tendon expansion, b) average calculated tensile stress (pretensioning) in the embedded and effectively bonded HM CFRP tendons obtained due to the expansion of special HPC with expansive agents (chemical prestress, Mix V prepared according to Table 1). A high residual expansion and therefore prestress are maintained also when the element is opened to drying from the age of 7 days. The element was a slab of cross-section 45×150 mm$^2$ reinforced with two ø5.5 mm CFRP tendons at a reinforcement ratio of 0.71%. The prestress shown in the graph b) was calculated based on the measured deformation (by strain gauges) on the surface of the tendons inside the HPC and on the elastic modulus of the tendons, equal to 460 GPa (previously measured in tensile tests of the tendons). Each curve is obtained from one independently-produced slab as an average from the tendons with two strain gauges per tendon. The horizontal axes show time from casting (days), the vertical axis in Fig. a shows strain (micrometer/meter), the vertical axis in Fig. b shows stress in tendon (MPa).

Figure 13:
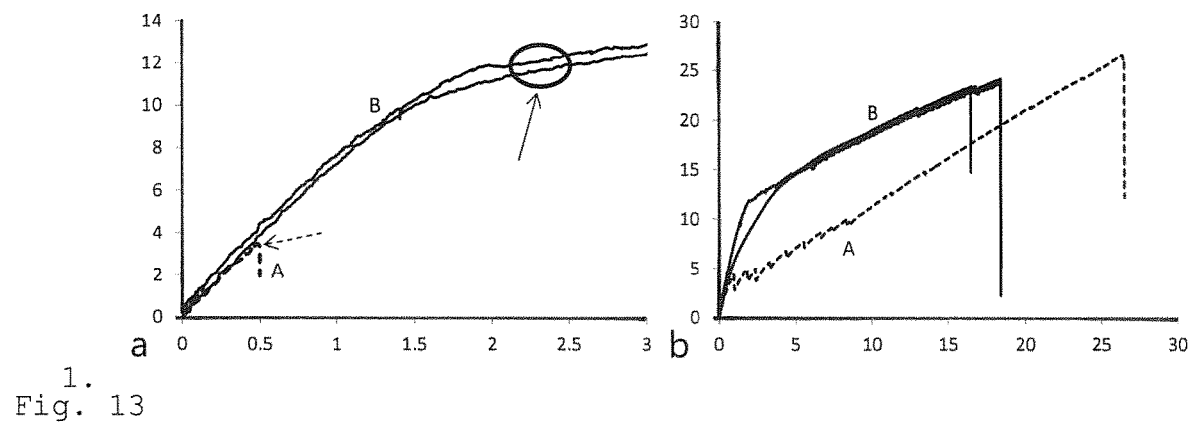

FIG. 13 shows bending stress vs. deflection curves until a) cracking, b) failure. The tested slabs had cross section of 45×150 mm$^2$ and were prepared either with reference conventional concrete reinforced with steel reinforcement (A—one dashed curve obtained from a single tested slab) or with chemically prestressed CFRP-reinforced HPC (B—two curves, Mix V prepared according to Table 1) (two curves obtained from one slab each). The horizontal axes show deflection (mm), the vertical axes show 6M/bh$^2$ (MPa). The arrows indicate the points of first crack formation (dashed for curve A and continuous for curves B).

Figure 14:
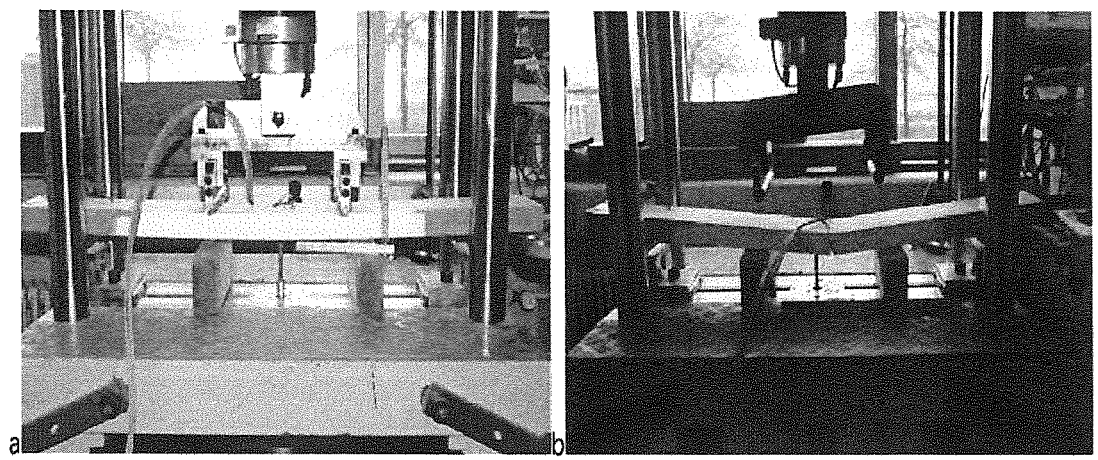

FIG. 14 shows chemically prestressed CFRP-HPC slabs (Mix V prepared according to Table 1): a) during testing and b) immediately after failure (prestressed slab failing on the concrete side by HPC crushing as expected by slab design).

In more general terms, in a first aspect, the invention relates to a cementitious mixture comprising (a) cement, (b) aggregate, (c) water, (d) expansive agent, (e) superabsorbent polymer, (f) shrinkage reducing admixture, (g) optionally plasticizer, (h) optionally mineral admixtures, and (i) optionally additives.

This aspect of the invention, particularly beneficial effects and suitable components, shall be explained in further detail below.

It was surprisingly found that such mixture is suitable for manufacturing concrete elements having improved prestress behaviour, particularly having improved chemical prestress behaviour. Without being bound to theory, it is believed that the combination expansive agent (d), SAP (e) and SRA (f) provides a particularly pronounced effect, exceeding the sum of the individual components itself; i.e. they interact synergistically. The cementitious mixtures disclosed herein combine two properties, which until now were considered to exclude each other: high expansion and high-performance.

A strong technical prejudice is present against designing and employing concrete or mortar with high levels of expansion, above approximately 1000 μm/m in unrestrained conditions, or even lower, especially if the expansion continues for several days or weeks (e.g. Cohen et al. Silica fume improves expansive-cement concrete, Concrete International, 13 (1991) 31-37; Nagataki and Gomi Expansive admixtures (mainly ettringite), Cem. Concr. Compos., 20 (1998) 163-170). Furthermore, a technical prejudice can be found in the literature against applying high levels of SRA. Masanaga and Fukuhara (US 2012/0289630 A1) teach that addition of many types of SRA leads to deterioration of freeze-thaw resistance. By limiting the level of expansion and shrinkage reduction to avoid concrete cracking and loss of mechanical properties (e.g. strength) and durability (e.g. freeze-thaw resistance), also the prestress levels that can be obtained with expansive mortar or concrete are necessarily limited and the prestressing reinforcement cannot be efficiently used. On the contrary, the inventive compositions allow for achieving very high levels of expansion in free conditions (FIG. 4), which exceed by even 10 times the values found in literature and applied in practice. This allows using the expanding potential in restrained conditions to produce high levels of chemical prestress (FIG. 12). Despite these extremely high levels of expansion and low levels of shrinkage, the cementitious compositions described herein show no disintegration and surprisingly good mechanical properties and durability. In particular, the mortars and concretes according to the invention show high strength and elastic modulus from early ages (FIG. 8) and excellent freeze-thaw resistance (FIG. 10), while at the same time allowing for high initial expansion, low shrinkage (FIG. 4) and therefore high residual prestress levels in restrained elements (FIG. 12). As a further benefit of the present invention, it was found that components (d), (e) and (f) are compatible with other components of the cementitious mixture.

As a further benefit, the invention allows avoiding the labor- and equipment-expensive curing solutions (e.g. high-temperature and high pressure underwater curing): curing in air or under water for about 28 days is enough.

Starting Materials:

Components (a) to (i) are commercial items or obtainable according to known methods. It is understood that the man skilled in the art will select type and amount of components (a) to (i), or combinations thereof, to obtain the desired concrete properties and avoiding incompatibilities.

Cementitious Mixture:

The term cementitious mixture is known and relates to mixtures suitable for concrete formation. Such mixtures at least contain cement, water. Typically, aggregates are also included in cementitious mixtures.

In an advantageous embodiment, the cementitious mixture is a high-performance ("HP") cementitious mixture. That is, the cementitious mixture is suited to obtain HP concrete elements; for ease of reading, the cementitious mixture is also termed "HP". Such HP mixtures are known in the field and typically contain less water than standard mixtures. HP mixtures typically have a water-to-cement ratio by mass lower than about 0.45, more typically lower than 0.40 and even more typically lower than 0.35. In addition, HP mixtures typically contain fine mineral admixtures (h). Such admixtures are able to improve the particle packing and decrease the porosity. HP mixtures are suitable for manufacturing concrete having a characteristic compressive strength of more than 55 MPa measured on cylinders and more than 67 MPa measured on cubes (C 55/67 according to the European nomenclature).

In a further advantageous embodiment, the cementitious mixture is a self-compacting ("SC") cementitious mixture. Such SC mixtures are known in the field and typically contain in addition to expansive agent (d), SAP (e), and SRA (f) a combination of further additives selected from the groups of superplasticizers (g), viscosity modifiers, stabilizers and fine filler. Such further additives (g, h, i) are not, or sparely, used in standard mixtures. In addition, SC mixtures are characterized by a special particle size distribution of aggregates and filler apt to enhance the flowability and the stability of the mixture. SC mixtures are suitable for manufacturing concrete by casting without vibrating or compacting steps. Characteristics of SC mixtures are described in the patent and non-patent literature and are known to the man skilled in the art. Constituent materials of SC mixtures, properties of fresh and hardened SC mixtures and their verification are subject to various standards, e.g. European standard BS EN 206-9:2010 Concrete; Additional rules for self-compacting concrete (SCC).

Component (a):

The term cement is known in the field; cement is a commercial item. A broad variety of cements may be used according to the present invention. For example, any cement defined in the European Standard EN 197-1 can be used as component (a).

The amount of component (a) may vary over a broad range, suitable are, for example 300 to 1000 kg/m$^3$, more preferred 350 to 900 kg/m$^3$ of the cementitious mixture.

In an advantageous embodiment, component (a) is selected from the group of Portland cements, blended cements (additionally containing next to Portland cement latent hydraulic, pozzolanic or inert mineral admixtures (f) or blends thereof), calcium aluminate cements, calcium sulfoaluminate cements, alkali-activated binders, supersulfated slag cements.

Preferred are Portland cement and blends of Portland cement and component (f); these cements correspond e.g. to CEM I-CEM V according to EN 197-1.

Component (b):

The term aggregate is known in the field; aggregates are a commercial item. A broad variety of aggregates may be used according to the present invention. The amount of component (b) may vary over a broad range, depending on the density and the size distribution of the aggregate, on the cement amount and on the water-to-cement ratio. Such amount being specified in the field either by mass or by volume. Suitable are, for example 700 to 2000 kg/m$^3$. Equally suited are aggregate amounts in the cementitious composition between 40 and 75% by volume, more preferably between 50 and 70% by volume.

When selecting aggregates for HPC, the man skilled in the art considers the strength of the aggregate, the optimum size of the aggregate, the bond between the cement paste and the aggregate, and the surface characteristics of the aggregate. Any of these properties could limit the ultimate strength of HPC.

In an advantageous embodiment, component (b) is selected from high-strength aggregates based on limestone, quartzite, granite, rhyolite, basalt, diabase, dolomite, recycled concrete aggregates and mixtures thereof. Preferably, the maximum aggregate size is 16 mm, particularly preferably 8 mm.

Component (c):

The term water is known in the field and includes water of various purities. Drinking water or water fulfilling the requirement of EN 1008:2002 or equivalent standards can be used.

The amount of component (c) may vary over a broad range, suitable are, for example from 40 to 600 kg per m³ of the cementitious mixture, preferably from 70 to 400 kg/m³.

Component (d):

The term expansive agent, also termed expansive admixture or expansive additive in literature, is known in the field. Expansive agents are commercial items.

Most expansive agents work by promoting the formation of a phase that causes expansion in the concrete, generally ettringite, monosulfate or portlandite, from a constituent containing aluminium oxide, calcium sulphate, calcium hydroxide or calcium oxide. Besides Portland cements (i.e., with high tricalcium aluminate, $C_3A$, content), e.g. calcium aluminate and calcium sulfoaluminate cements (CSA) may be used as source for aluminium oxide. Other suitable expansive agents work on the basis of the reaction of CaO to portlandite or of MgO to brucite.

Particularly preferred expansive agents are selected from the group of CSA-based expansive agents. CSA based agents are known in the field as mineral expansive agents for cements. Their addition promotes formation of ettringite, $(CaO)_3(Al_2O_3)(CaSO_4)_3 \cdot 32H_2O$, that is known to lead to expansion of concrete. CSA-based agents may be obtained either by blending the necessary phases or in a clinkering process. Preferred CSA-based agents contain by mass: $Al_2O_3$ 10-20% (even more preferred 12-15%), $SO_3$ 25-35% (even more preferred 27-31%), CaO 45-60% (even more preferred 50-54%), MgO 0-3%, $SiO_2$ 0-3%. The preferred phase composition is by mass: anhydrite 40-60% (even more preferred 45-55%), ye'elimite 15-30% (even more preferred 20-25%), free lime 20-35% (even more preferred 25-30%), periclase 0-3%, calcite 0-3%.

The amount of component (d) may vary over a broad range, suitable are, for example from 30 to 150 kg per m³ of the cementitious mixture, preferably from 50 to 120 kg/m³. It was surprisingly found that comparatively high amounts of compound (d) result in beneficial cementitious mixtures. This finding is against the general knowledge in this field, which recommends against high levels of expansive agent (see e.g. Berke et al., discussed above, p. 15, $2^{nd}$ paragraph). Advantageously, the amount of component (d) is at least 10%, preferably at least 12% and even more preferably at least 15% of the minimum cement amount in the cementitious mixture (this corresponds to a ratio (d):(a) of at least 1:10, preferably at least 3:25, more preferably at least 3:20). Without being bound to theory, it is believed that such amounts of expansive agent allow for a suitable level of free expansion and tensioning of tendons.

The particle size of component (d) may vary over a broad range, but typically is 0.5-150 micrometers. Such particle size corresponds to a specific surface (Blaine) typically of 2000-3700 cm²/g.

Component (e):

In the context of this invention, the term "superabsorbent polymers", or "SAP" includes "(organic) hydrogels".

The term organic hydrogels is known in the field; hydrogels are commercial items. Hydrogels are polymeric materials exhibiting the ability to swell in water and retain a significant fraction of water within their structure, without dissolving in water. The water absorption of a hydrogel may be up to several hundred times its own weight, e. g. up to 1500 times its own weight. The term hydrogels includes polymeric material of natural origin, modified natural polymers and synthetic polymers; the latter being preferred.

The amount of component (e) may vary over a broad range, suitable are, for example 0.05-2.0%, preferably 0.1-1.0%, particularly preferred are 0.2-0.7% by mass of cement (a). Suitable organic hydrogels may be selected from the group consisting of starch, modified starch, agar, agarose, dextran, carrageenan, alginic acid, cellulose, cellulose derivatives (such as carboxymethyl cellulose, "CMC"), poly (vinyl alcohol), poly(vinyl chloride), poly(acrylic acid), polyacrylamide, polyethylene glycol, polyethylene oxide, starch/acrylonitrile graft copolymers, polyacrylonitrile, vinyl acetate/acrylic acid salt copolymers, vinyl alcohol/ acrylic acid salt copolymers, polyacrylic acid salts, acrylate derivatives, olefin/maleic anhydride copolymers, poly(carboxylic acid salts), poly(acrylic acid salts) and olefin/maleic anhydride copolymers.

In an embodiment, SAP are used. SAP are commercial items. SAP are typically cross-linked polyelectrolytes; preferred are covalently cross-linked polyacrylamides polyacrylates. Preferred SAP are obtained by solution polymerization. Suitable SAP include finely divided solid hydrogel forming polymers, wherein not more than 2% by weight are more than 200 micrometers in particle size, and wherein said polymers contain units derived from monoethylenically unsaturated C3- to C25 carboxylic acid or anhydride monomer (preferably acrylic acid monomer). Such SAP are disclosed in EP 1329435, which is incorporated by reference in its entirety.

In a preferred embodiment, dry SAP particles are included in the inventive composition. When mixing the components, water is consumed by hydrating cement or lost by evaporation to the environment. SAP release preabsorbed water and allow maintaining high internal RH in the pores during the initial stages of cement hydration. This is supposed to have a promoting effect on the production of expansive hydration products that form in high RH conditions and further expand (e.g. swelling of ettringite) on absorbing water. Therefore, the inventive composition benefits from the synergistic action of the three components; expansive agent (d), superabsorbent polymer (e) and shrinkage reducing admixture (f).

More in detail, the SAP (e.g. 0.2-0.7% by mass of cement) are added as a dry powder to the concrete mixture. During mixing and casting, the SAP absorb a part of the mixing water and create water-filled inclusions in the concrete matrix. After setting and during hardening of the concrete, the water contained in the SAP is sucked into the concrete matrix by capillary forces, which are particularly strong in HPC due to its low water-to-binder ratio and fine pore structure.

Figure 3:
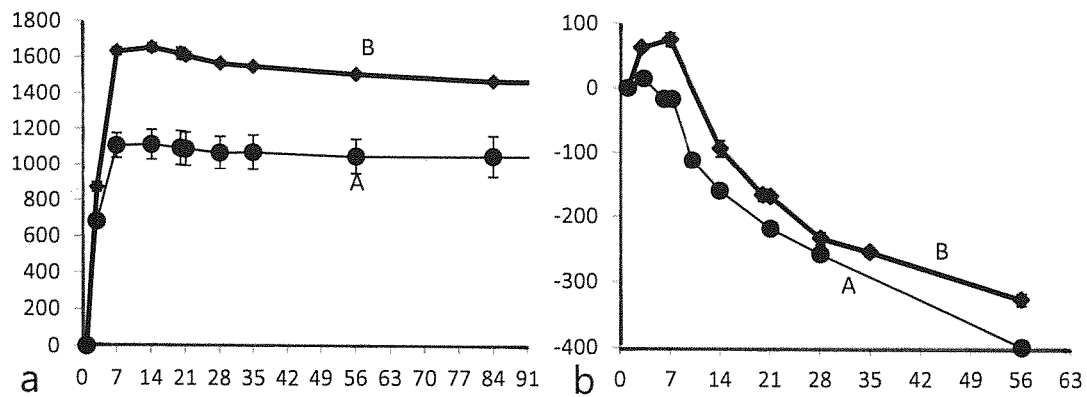

With addition of SAP, the expansion of concretes can be promoted both for low levels of expansive agent, aimed at compensating for shrinkage, or in high expansion concretes aimed at chemical prestress (see FIG. 3). The application of SAP leads to an enhanced expansion for different types of expansive and shrinkage-reducing admixtures. In case of component (d) being a CSA-based admixture, the formation of ettringite will be observed; In case of component (d) being CaO, the formation of calcium hydroxide (portlandite) will be observed. In case of component (d) being a MgO-based admixture, the formation of magnesium hydroxide (brucite) will be observed.

When using the inventive composition, expansion of exemplary high performance concrete to be applied for chemical prestress can be enhanced to approximately 1600 microstrain after 7 days of sealed curing thanks to using SAP, while without SAP only about 1100 microstrain can be reached, FIG. 3. The obtained initial expansion can then be maintained during shrinkage at 70% RH and decreases by only about 160 microstrain after 3 months of drying. At this point, the residual expansion of the concrete with SAP is still about 420 microstrain higher than the reference concrete without SAP (1470 microstrain versus 1050 microstrain, respectively). As long as shrinkage reduction is concerned, addition of SAP allows for obtaining expansion at 7 days of about 75 microstrain compared to actual shrinkage of about 16 microstrain for concrete without SAP, FIG. 3 right.

Component (f):

Shrinkage reducing admixtures (SRAs) are components for cementitious mixtures well known to the person skilled in the art; such admixtures are commercial items. Shrinkage-reducing admixtures are known to reduce both the drying shrinkage of concrete as well as the crack widths due to restrained shrinkage. Shrinkage-reducing admixtures typically contain non-ionic surfactants that reduce the surface tension of the pore solution in the concrete and thereby lead to a reduction in shrinkage. Accordingly, shrinkage-reducing admixtures comprise compounds selected from the group consisting of:

mono-alcohols, which may be linear, branched or cyclic;
alkanediols, such as glycols or oxyalkylene-glycols;
alkyl ether oxyalkylenes glycols with a hydrophobic tail-hydrophilic head structure;
polymers composed of dimers, trimers or graft polymers with hydrophilic heads, side chains and head spacers.

Advantageously, SRAs contain one or more of polyoxyalkylene alkyl ethers, polypropylene glycol, waxes, hexylene glycol, neopentyl glycol, aliphatic propylene glycol ethers. Preferred SRAs contain neopentyl glycol and/or propylene glycol ether.

Commercial SRA may additionally contain other substances such as accelerators, dispersers, condensers, air-entraining agents and/or defoamers.

The amount of component (f) may vary over a broad range, but typically is in the range of 0.1-5% by mass of component (a), preferably in the range of 0.5-4%.

Component (g):

Plasticisers are components for cementitious mixtures well known to the person skilled in the art and include plasticisers and superplasticizers, preferably superplasticizers; such agents are commercial items. Preferred superplasticizers are selected from the group of polycarboxylate ethers.

Superplasticizers are considered important for the present self-compacting compositions, but are not essential for obtaining mixtures with stable, durable expansion (FIG. 9). If present, the amount of component (g) may vary over a broad range, but typically is in the range of 0.01-5% by mass of component (a), preferably in the range of 0.05-4%, more preferably 0.1-3%.

Component (h):

Mineral admixtures are components for cementitious mixtures well known to the person skilled in the art. Component (h) is optional.

If present, the amount of component (h) may vary over a broad range, but typically is in the range of 5 to 230% by mass of component (a), preferably in the range of 10 to 100% and more preferably in the range 15 to 50%.

A wide variety of mineral admixtures may be used. Preferred mineral admixtures for the inventive compositions include one or more components selected from the group consisting of fly-ash, silica fume, metakaolin, activated clays, ground blast-furnace slag, steel slag, burnt shale, limestone, ground quartz, natural pozzolans, and limestone. As a preferred component (h), silica fume is named. As further preferred component (h), fly ash is named. As further preferred component (h), limestone is named.

In one embodiment, component (h) may be part of the cement ("blended cement"), as typically used in Europe. In an alternative embodiment, component (h) may be added separately to the cementitious mixture, as is typically done outside Europe. In a further alternative embodiment, component (h) may be both: part of the cement and an additional component. This embodiment may be realized in cases where two or more components (h1), (h2) . . . are used.

Component (i):

Additives are components for cementitious mixtures well known to the person skilled in the art. Typically, "superabsorbent polymers", "shrinkage reducing admixtures", and "plasticizers" (i.e. components (e) to (g)) are considered "additives". However, while components (e) to (f) are mandatory to the inventive cementitious mixture, the additives discussed in this section as component (i) are optional. These optional concrete additives are commercial items; the majority of additives are formulated admixtures that may combine more than one of the functionalities listed below in a single product.

If present, the amount of component (i) may vary over a broad range, but typically is in the range of 0.01-5% by mass of component (a), preferably in the range of 0.05-4%, more preferably 0.1-3%.

Typically, additives are grouped by their purpose; not grouped by chemical structure. Preferred optional additives for the inventive compositions include one or more components selected from the group consisting of flowing agents, hydration retarders, accelerators, air entrainers, defoamers, viscosity modifiers, stabilizers. Preferred as component (i) in the invention are viscosity modifiers and stabilizers. It is understood that the man skilled in the art will select as component (i) any of the components listed above, or combinations thereof, to obtain the desired fresh or hardened concrete properties.

In a second aspect, the invention relates to processes (methods) for manufacturing a cementitious mixture as described herein. This aspect of the invention, particularly beneficial effects and suitable components, shall be explained in further detail below.

The manufacturing of cementitious mixtures is known per se. As outlined above, the cementitious mixtures disclosed herein differ from previously known cementitious mixtures in the presence of components (d), (e), (f) and optionally (g) to (i) as defined herein. As these components are present in comparatively small amounts, known manufacturing methods may be used; components (d), (e), (f) and optionally (g) to (i) simply being added to the starting materials. It is considered advantageous that the inventive mixtures may be produced using standard equipment and known methods.

Accordingly, the invention provides for a process of manufacturing a cementitious mixture as described herein comprising the steps of providing components (a) to (f) and optionally (g) to (i) and combining these components to obtain the cementitious mixture. The process may be continuous or batch-wise.

In general, component (e) may be added during mixing, either as a dry admixture or as a liquid admixture (where the hydrogel is emulgated in a suspension). Accordingly, in one embodiment, the SAP (e) are added dry in step (I). Alternatively, in a further embodiment, the SAP (e) are added with the mixing water, especially in case the SAP (e) is emulsified. Alternatively, in still a further embodiment, the SAP (e) are added as a final component at the end of the process.

In an embodiment, the above components may be premixed. In such embodiment, the liquid components [(f), (g) and optionally (i)] and water are combined to obtain a liquid mixture (such as a solution or biphasic aqueous system) and the dry components [(a), (b), (d), (e) and optionally (h)] are combined to obtain a dry mixture. The above dry and liquid mixtures are then combined to obtain the cementitious mixture of the present invention.

In a further embodiment, the above components may be premixed in an alternative way. In this embodiment, the liquid components [(f) and optionally (g) and (i)] and water are combined to obtain an aqueous mixture (such as a solution or suspension); the dry components [(a), (b), (d), and optionally (h)] are combined to obtain a dry mixture, and component (e) (SAP) is provided in a liquid, non-aqueous diluent. The above dry and liquid mixtures are then combined to obtain the cementitious mixture of the present invention.

Further, admixtures (f) and optionally (g) may be present in liquid or solid (dry) form. Accordingly, in one embodiment, liquid components (f) and optionally (g) are added with the mixing water. In a further embodiment, dry components (f) and optionally (g) are added with the above-named dry components.

The person skilled in the art is in a position to find appropriate variants or alternatives to the above processes. Particularly, some components may appear at different steps in the process.

In a third aspect, the invention relates to a concrete element comprising the components (a) to (f) and optionally (g) to (i) as defined above. This aspect shall be further explained below.

The term concrete element, as used herein, denotes any shaped article comprising or consisting of concrete as defined herein; it is not limited to a specific size. The term thus includes building structures or parts thereof, such as walls, slabs, pavements, beams, columns, foundations, ceilings, façade elements as well as other articles made of concrete, such as containers, vessels, panels, plates.

According to this invention, the concrete element may be further reinforced or not.

Thus, in one embodiment, the invention provides a non-reinforced concrete element comprising, particularly consisting of, components (a) to (i) as defined above.

In an alternative embodiment, the invention provides a passively reinforced concrete element comprising components (a) to (i) as defined above and further means for reinforcement, such as reinforcement bars made of steel or other suitable material. The reinforcement may also be provided in form of steel fibres or other structural fibres of different materials (e.g., polymeric, basalt, carbon, glass, natural fibers).

In a further embodiment, the invention provides a pre-stressed concrete element (i.e. an actively reinforced concrete element) comprising components (a) to (i) as defined above and further means for prestressing the element. The prestressing may be provided, e.g., in form of prestressing steel tendons, carbon-fibre reinforced polymer (CFRP) tendons, dry or impregnated aramid fibre based tendons, glass-fibre reinforced polymer tendons (GFRP), basalt fibre reinforced polymer tendons (BFRP) and others. Pre-tensioning and post-tensioning are prestressing techniques covered by the invention.

Figure 1:
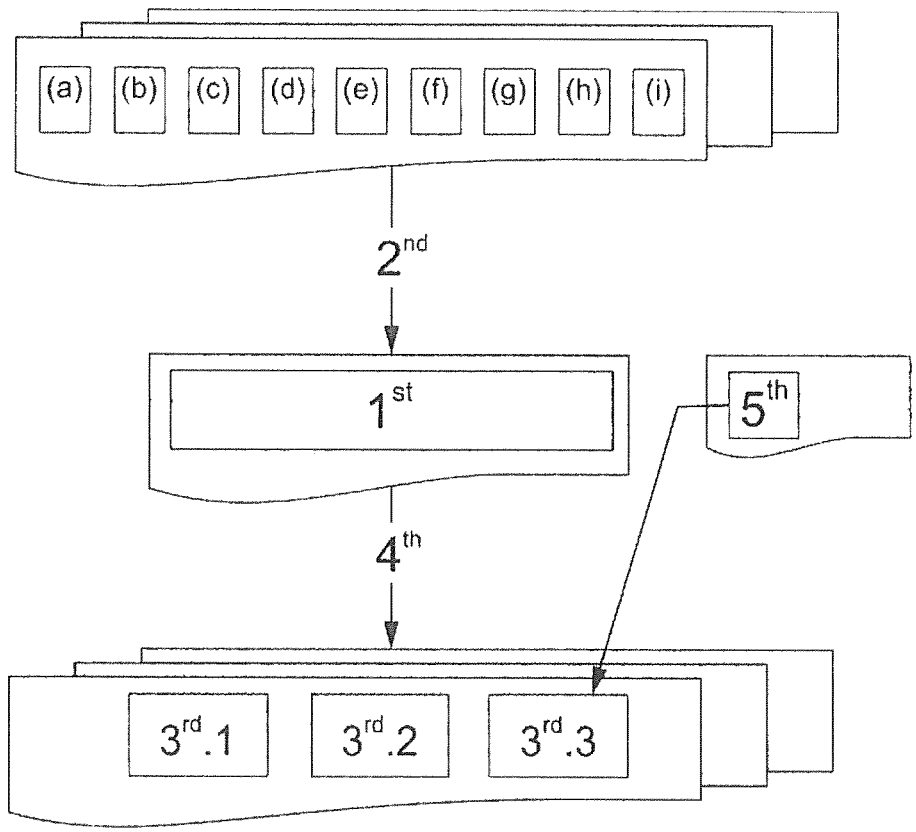
Figure 2:
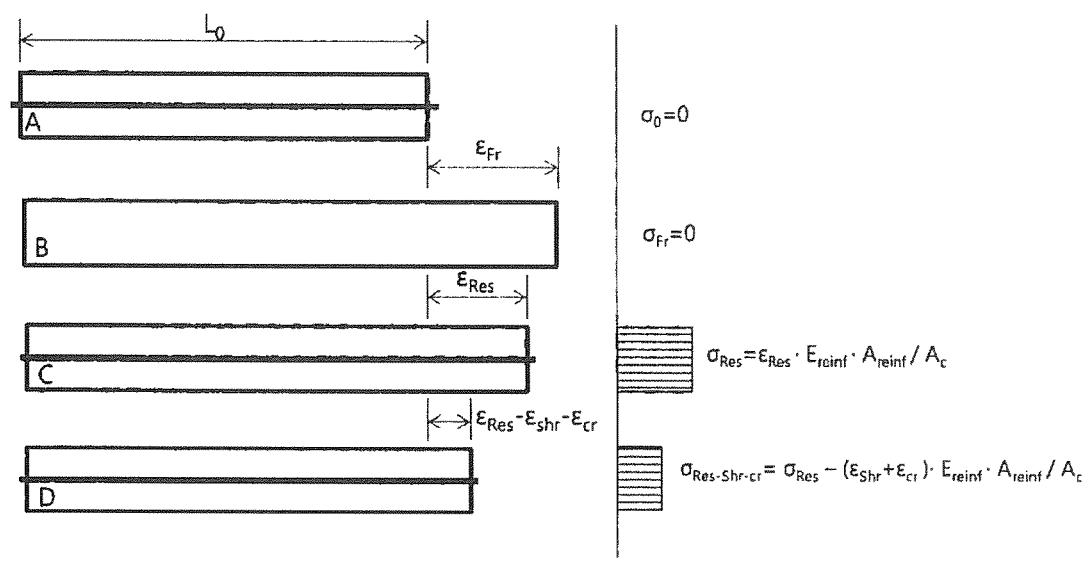

In a preferred embodiment, the invention provides for a prestressed concrete element comprising components (a) to (i) defined herein and CFRP tendons, particularly CRFP tendons as defined below (fifth aspect of the invention). It was found that the combination of components (a) to (i) and CFRP tendons allow for manufacturing of prestressed concrete elements in free forms, i.e. rectangular shaped elements, elements curved in one dimension and elements curved in two dimensions. According to this embodiment, the concrete element is self-prestressed (FIG. 2).

In a further embodiment, the invention provides for a concrete element as described herein is passively reinforced with CFRP tendons in one or two dimensions; self-prestressed; and optionally curved in one or two dimensions. As outlined herein, self-prestressing being obtained by the action of the concrete expansion.

In a fourth aspect, the invention relates to methods for manufacturing a concrete element as described herein. The manufacturing of such elements depends on the nature of the elements, i.e. non-reinforced, passively reinforced or actively reinforced. This aspect shall be further explained below.

A concrete element obtainable by or obtained by the methods as described below is also subject of the present invention.

Non-Reinforced Concrete Elements:

In one embodiment, the invention provides a method for manufacturing a concrete element as described herein, said method comprising the steps of (i) providing a cementitious composition as described herein (ii) casting or pumping the cementitious composition into moulds with compacting and/or vibrating, (iii) curing the cementitious composition and (iv) demolding.

In a further embodiment, the invention provides a method for manufacturing a concrete element as described herein, said method comprising the steps of (I) providing a cementitious composition as described herein (preferably an SCC composition), (II) casting or pumping the cementitious composition into moulds without compacting and/or without vibrating, (III) curing the cementitious composition and (IV) demolding.

Manufacturing steps (I) to (IV) as described in this aspect of the invention are known per se, but not yet applied to the inventive cementitious mixtures as described herein. It is considered advantageous that the inventive concrete elements may be produced using standard equipment and known methods.

Actively Reinforced Concrete Elements:

In addition, for prestressed elements, step (I) also includes pre-tensioning the prestressing tendons or providing and placing prestressing ducts and introducing the prestressing tendons in the ducts and step (IV) includes releasing the anchorages of the prestressing tendons in order to transfer the prestress to the concrete (pre-tensioning method) or post-tensioning the tendons to prestress the concrete (post-tensioning method).

Passively Reinforced Concrete Elements:

To obtain reinforced concrete elements, step (I) also includes providing and placing means for reinforcement in a mould. The initially passive reinforcement bonded to the concrete will be prestressed by the action of the expansive concrete according to the invention, this principle is shown in FIG. 2. This method is particularly suited for obtaining concrete elements curved in one dimension (1D) or even in two dimensions (2D). While it is difficult to obtain concrete elements that are 1D bent and actively prestressed, it is technically very difficult and expensive to obtain concrete elements that are 2D bent and actively prestressed. Accordingly, it is seen as a further benefit of this invention to provide a method for manufacturing of passively reinforced concrete elements that are bent either in one or in two dimensions.

In a fifth aspect, the invention relates to materials suitable as tendons for the concrete elements as described herein. This aspect of the invention shall be further explained below.

In one embodiment, the invention provides for tendons comprising high-modulus pitch-based or high-modulus PAN (polyacrylonitrile)-based carbon fibers embedded in a matrix selected from the group consisting of epoxy polymers and coated with quartz sand. The tendons described herein are also termed "HM CFRP tendons".

Tendons: The term "tendon" is known in the field and describes structural elements elongated in 1 dimension. Typical dimensions include the diameter range of 2 mm to 24 mm, preferably 3 mm to 16 mm.

The inventive tendons typically have a tensile strength between 1,000 and 2,500 MPa. Further, the tensile stress generated in the inventive tendons typically reaches levels above 400 MPa (see e.g. FIG. 12). The inventive tendons further typically have an axial stiffness ($E_{11}$ modulus) of 400 GPa or more. These properties ensure that an efficient prestress is obtained.

Carbon Fibers: Preferably, the carbon fibers represent 55% to 65% of the CFRP tendon's cross section. Such fibers are commercial items and available e.g, from Mitsubishi Dialead K63A12 à 12 k or 16 k filaments with modulus $E_F$=790 GPa and tensile strength $\sigma_u$=2600 MPa or of type Dialead K13916 à 12 k or 16 k filaments with modulus $E_F$=760 GPa and tensile strength $\sigma_u$=3200 MPa.

Matrix: Epoxy Polymers are commercial items and may be selected from a large variety of materials known in the field. Preferably, the epoxy polymer is of the Araldite type.

Coating: Preferably, the quartz sand is embedded in an additional matrix on the surface of the tendon. (e.g. of type Araldite). Preferably, the quartz sand has a mean particle diameter of 0.1 mm-1 mm, particularly preferably 0.3-0.7 mm.

Manufacturing of tendons: The tendons as described herein may be manufactured according to processes known per se. In one embodiment, the production process is a pultrusion or a tape-laying process followed by an in-line spray coating or a sand immersion coating of the epoxy coated tendon surface with quartz sand.

Use of tendons/Manufacturing of HP-CFRP reinforced concrete elements: In one embodiment, a mold with pre-installed CFRP reinforcement is provided, and cementitious composition, preferably as described herein, is poured into the mold. In FIG. 11, manufacturing of a self-prestressed concrete slab is presented. As can be seen, self-compacting concrete is simply poured into the mold with pre-installed CFRP reinforcement. Application of self-compacting concrete allows obtaining a good bond between the sand coated tendons and the concrete and eliminates the need of time-consuming mechanical compaction.

In FIG. 12, the expansion and the prestress generated in the HM CFRP tendons due to the expansion of a special HPC (containing Mix no. V prepared according to Table 1) is presented.

By tailoring the amount of expansion in the concrete, it is also possible to generate lower levels of prestress in the tendons, as may be required by specific applications. The expansion of the concrete at early age (within the first week of hardening) and after that (up to until 4 weeks after casting) is transferred to the tendon and therefore pretensioning of the tendon is obtained. An efficient transfer of the prestress between the concrete and the tendon is obtained by coating the surface of the tendon with quartz sand, which is embedded in additional epoxy matrix on the surface of the tendon. This is called bond by microinterlocking and adhesion. A good bond between the tendon and the concrete is also necessary for further transferring the prestress and additional tensile stresses under service loads.

In a further embodiment, the transfer of the prestress of the tendons and further prestressing of the concrete can be obtained by (passive) anchoring systems.

In a further embodiment tendons are embedded in the concrete in an amount corresponding to 0.1-10% of reinforcement ratio.

The inventive tendons further allow applying prestress in multiple directions. This is another high impact improvement as it allows for manufacturing of concrete elements of complex shapes. Compared to the high cost for multi-axial prestress with conventional prestressing techniques, these elements are now available at low additional cost. Furthermore, until now, conventional mechanical prestressing (post-tensioning) allowed only for prestressing relatively simple shape elements (beams, slabs), while prestressing in two perpendicular directions (e.g. plates and shells) was complicated and therefore expensive. According to this embodiment of the present invention, pretensioning can be generated on tendons in any configuration (shape, direction). This opens the possibility of obtaining high strength and durable prestressed concrete shells of sophisticated shapes. Thin prestressed concrete shells, while aesthetically appealing, have been challenging to manufacture with the traditional prestressing technologies. The thickness of the concrete elements obtained with the present invention could be reduced to as little as 30-40 mm. Accordingly, the present invention also provides for thin-walled concrete elements prestressed in more than one dimension, characterized in that the elements comprise components (a) to (f) and optionally (g) to (i) as defined herein and further comprising tendons as defined herein.

To further illustrate the invention, the following examples are provided. These examples are provided with no intent to limit the scope of the invention.

1. Without Reinforcement

HPC mixtures were prepared, according to Table 1.

TABLE 1

| | Mass [kg/m³] Mix name | | | | |
|---|---|---|---|---|---|
| Material | MIX I: 20% CSA + 3.1% SRA + 0.37% SAP | MIX II: 10% CSA + 2.9% SRA + 0.34% SAP | MIX III: 15% CSA + 3.0% SRA + 0.35% SAP | MIX IV: 15% CSA + 3.0% SRA + 0.35% SAP | MIX V: 25% CSA + 3.2% SRA + 0.38% SAP |
| Cement (CEM I 52.5R by Jura Cement) | 500 | 540 | 520 | 440 | 480 |

TABLE 1-continued

| | Mass [kg/m³] Mix name | | | | |
|---|---|---|---|---|---|
| Material | MIX I: 20% CSA + 3.1% SRA + 0.37% SAP | MIX II: 10% CSA + 2.9% SRA + 0.34% SAP | MIX III: 15% CSA + 3.0% SRA + 0.35% SAP | MIX IV: 15% CSA + 3.0% SRA + 0.35% SAP | MIX V: 25% CSA + 3.2% SRA + 0.38% SAP |
| CSA-based expansive agent (DENKA CSA #20 by Denka) | 100 | 54 | 78 | 66 | 120 |
| SCM (limestone powder, sh_easyflow by sh minerals) | 25 | 27 | 26 | 22 | 24 |
| water | 219 | 217 | 218 | 264 | 218 |
| Superplasticizer (Sika Viscocrete-1S by Sika) | 14.4 | 16.1 | 15.0 | 2.6 | 17.5 |
| SRA (Sika Control 60 by Sika) | 15.6 | 15.5 | 15.6 | 13.2 | 15.6 |
| SAP (solution polymerized, sizes 63-125 µm) | 1.84 | 1.83 | 1.84 | 1.55 | 1.84 |
| Aggregates (alluvial sand) | 1458 | 1458 | 1473 | 1467 | 1464 |
| w/b total | 0.35 | 0.35 | 0.35 | 0.50 | 0.35 |

The fresh concrete compositions possess high flowability and self-compacting properties, eliminating the need of vibration and leading to a very tight microstructure.

Structural elements with embedded reinforcement are obtained by pouring the flowable concrete compositions of example 1 into molds with preinstalled reinforcement. The concrete elements are demolded at approximately 1 day, allowing for the expansion to start developing, and then immersed in water until the age of 28 days or until the age at which the expansion stabilizes. The expansion in free (unrestrained) and restrained conditions is presented in FIG. 4-7.

A person skilled in art would consider these very high levels of expansion (above 5000 µm/m at 28 days in unrestrained conditions for MIX I) as conductive to cracking and loss of mechanical properties and durability. Also, the levels of restrained expansion are considerably higher than the maximum of 700-1000 µm/m recommended by Nagataki and Tsuji (Recommended practice for expansive concrete, Japan Society of Civil Engineers, CONCRETE LIBRARY OF JSCE, 1994. Japan Society of Civil Engineers). Further, the high amounts of SRA used for reducing shrinkage of the expansive concretes would be considered by a person skilled in art as conductive to further deterioration of mechanical properties and freeze-thaw resistance. Surprisingly, the mortars and concretes according to the invention show very good mechanical properties and durability, which is highlighted by the high strength and high freeze-thaw resistance. Moreover, the expansion stabilizes even if samples are continuously stored under water, which prevents cracking at later ages. This is confirmed by stable, high compressive strength (see FIG. 8) measured on unrestrained prismatic samples stored under water for 90 days or longer. Possibly, even higher strength and elastic modulus are expected in restrained samples. As a consequence of the very high levels of expansion in restrained conditions in the first few days of curing underwater (e.g. FIG. 4), followed by moderate shrinkage at drying, the concrete or mortar elements show good overall volume stability and allow obtaining high chemical prestress and excellent mechanical properties.

Figures 4, 5:
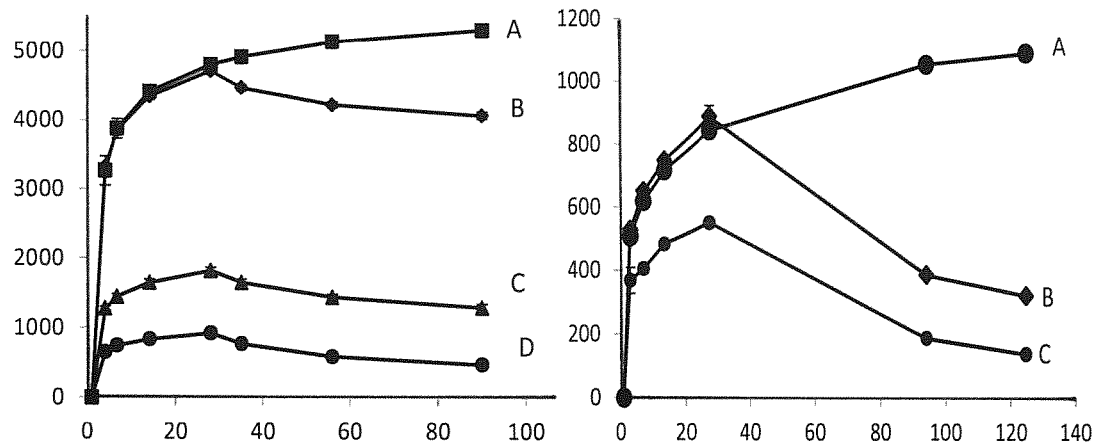
FIG. 5 shows the deformations of the MIX II samples prepared according to Table 1 tested under the same conditions as given in FIG. 4 (for the restrained deformations, only one reinforcement ratio, r=1.0%, was tested).
The meanings of A, B, C, horizontal axis and vertical axis are as in FIG. 4.
Figures 6, 7:
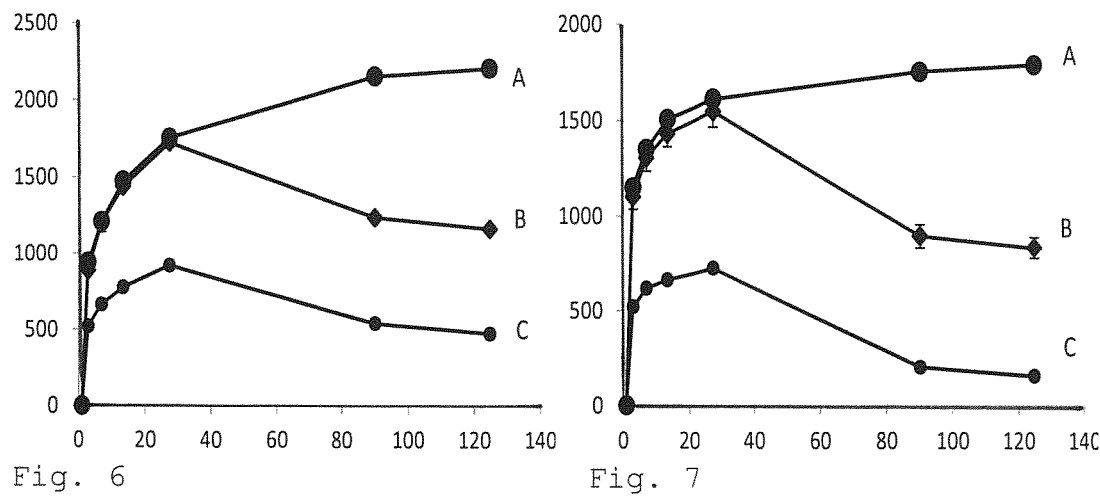
FIG. 6 shows the deformations of the MIX III samples prepared according to Table 1 tested under the same conditions as given in FIG. 4 (for the restrained deformations, only one reinforcement ratio, r=1.0%, was tested).
The meanings of A, B, C, horizontal axis and vertical axis are as in FIG. 4.
FIG. 7 shows the deformations of the MIX IV samples prepared according to Table 1 tested under the same conditions as given in FIG. 4 (for the restrained deformations, only one reinforcement ratio, r=1.0%, was tested).
The meanings of A, B, C, horizontal axis and vertical axis are as in FIG. 4.

In FIG. 8, the evolution of compressive strength in time is presented for different mixes. Surprisingly high strengths were obtained in specimens without any restraint and therefore undergoing very high expansion (see FIG. 4-7) while cured underwater. The continuous development of strength while stored underwater shows that damage due to excessive expansion did not occur. This is also confirmed by the elastic modulus measured on two groups of unrestrained, highly-expansive MIX I samples (40×40×160 mm³) at 90 days and up to 1 year:

stored under water until 28 days from demolding (at 1 day) and later drying at 70% RH until the age of testing (see also curve B in FIG. 4), and stored continuously under water until the age of testing (see also curve A in FIG. 4).

As shown by the results in Table 2, the elastic modulus was surprisingly high for the two groups of highly expanding samples. Moreover, no significant difference could be observed between the two groups, showing that the further expansion occurring after 28 days has no negative effect regarding mechanical properties compared to samples with expansion ceased at 28 days and exposed to drying, even up to 1 year.

TABLE 2

| Elastic modulus of MIX I samples (40 × 40 × 160 mm³, average from three samples ± standard deviation) | | |
|---|---|---|
| | Stored under water from 1 day to 28 days, later drying at 70% RH until testing | Stored under water from 1 day until testing |
| Elastic modulus at 90 days [GPa] | 35.3 ± 0.7 | 34.2 ± 1.0 |
| Elastic modulus at 1 year [GPa] | 35.0 ± 0.9 | 36.2 ± 0.7 |

The synergistic effect of the composition according to the invention can be seen if either SAP or SRA, or both components at the same time are removed from the mixture MIX I, FIG. 9.

The durability of the mortar or concrete prepared according to the present invention can be assessed by means of freeze-thaw tests. Other commonly used type of durability tests, addressing chlorides ingress and corrosion of metallic reinforcement, are not relevant in this case since the used CFRP tendons do not corrode.

In FIG. 10, the surfaces of the samples after freeze-thaw testing of unrestrained samples according to SIA 262/1:2003 (Appendix C) are presented. The samples were prepared according to mix design MIX I (Table 1) and initially stored under water for 35 days before the tests took place. The samples were subject to 28 freeze-thaw cycles (2 cycles per day, one cycle when the temperature changes between +15° C. and −15° C. lasts 12 h) with the upper surfaces exposed to de-icing salts (3% NaCl solution). The limited damage after the tests proves the good durability of mortars and concretes according with the present invention. No cracking due to excessive expansion was observed in the concrete elements. Only punctual scaling could be observed and the mass of material scaled off was 39±19 g/m$^2$. The mean value lower than 200 g/m$^2$ (and the value+standard deviation lower than 250 g/m$^2$) allows classifying the concrete as belonging to the high freeze-thaw resistance class (corresponding to the highest exposure class XF4) according to Table NA.9, SN EN 206-1/NE: 2013. Furthermore, in order to gain higher confidence regarding material durability, the same samples were subject to another 28 freeze-thaw cycles after additional underwater storage during 77 days (following the initial standard tests). No cracking of the samples was observed even after such intense testing, with the cumulative amount of scaled-off material (cumulative from all 56 cycles) below 179±69 g/m$^2$.

2. With Reinforcement

The CFRP tendons were manufactured batchwise in a commercial company by conventional tape-laying of the HM carbon fibre epoxy prepregs, followed by filament winding of a PP foil to define the round cross section, before hardening under tension in a furnace for 2 h at 140° C. Afterwards, sand coating was applied on the surface of the tendons by sand-immersion of the araldite coated tendon surface.

FIG. 13 shows the bending moment M (here as induced bending stress) vs. midspan deflection of a HPC slab centrally prestressed with two CFRP tendons by the present chemical-prestress technology and tested in 4-point bending. The stress ($=6M/bh^2$) vs. deflection behavior is exactly as it would be expected for a slab of the same geometry prestressed in a conventional way with CFRP tendons (taking into account the higher prestress losses of the conventionally-prestressed beam). The behavior of a concrete slab with the same geometry made of conventional reinforced concrete is presented as a reference. The test setup and failure mode of the chemically-prestressed slab are shown in FIG. 14. The slab reaches its full bending capacity and fails by concrete crushing in compression without any slippage (draw-in) of the CFRP tendons (assessed measuring drawing at their ends and by strain gauges directly applied on the tendon surface at midspan). Therefore, the anchorage of the full tensile strength (and prestress) of the CFRP tendon in the present expanding concrete could be clearly demonstrated. The possibility of eliminating the external pretensioning and anchoring of the CFRP tendons represents a high-impact, innovative improvement of the CFRP-prestress technology. Self-prestress by means of concrete expansion would reduce the equipment and labor costs of prestressing and at the same time avoid dangerous and costly failure of anchorages, as well as reducing costly prestress losses induced by shrinkage of the concrete.

The invention claimed is:

1. A cementitious mixture comprising:
   (a) cement, 300 to 1000 kg/m$^3$ of the cementitious mixture;
   (b) aggregate, 700 to 2000 kg/m$^3$ of the cementitious mixture;
   (c) water, 40 to 600 kg/m$^3$ of the cementitious mixture;
   (d) expansive agent, 30 to 150 kg/m$^3$ of the cementitious mixture, selected from the group consisting of calcium-sulfoaluminate (CSA)-based expansive agents;
   (e) superabsorbent polymer, 0.1-1.0% by mass of component (a), selected from the group consisting of cross-linked polyelectrolytes;
   (f) shrinkage reducing admixture, 0.1 to 5% by mass of component (a);
   (g) optionally plasticizer, 0.01 to 5% by mass of component (a);
   (h) optionally mineral admixtures, 5 to 230% by mass of component (a);
   (i) optionally additives in the range of 0.01-5% by mass of component (a); and
   where the ratio component (d):component (a) is at least 1:10.

2. The cementitious mixture according to claim 1, wherein:
   component (a) is selected from the group of Portland cements and blended cements containing Portland cement clinker; and/or
   component (b) is selected from aggregates with the maximum aggregate size of 16 mm; and/or
   component (e) is selected from the group consisting of solution-polymerized, cross-linked polyelectrolytes; and/or
   component (f) is selected from the group consisting of non-ionic surfactants; and/or
   component (g) is selected from the group consisting of super-plasticisers; and/or
   component (h) is selected from the group consisting of silica fume, fly ash, metakaolin, activated clays, burnt shale, ground blast furnace slag, ground quartz, natural pozzolans, and limestone; and/or
   component (i) is selected from the group consisting of defoamers, stabilizers, air-entraining agents, hydration retarders or accelerators, flowing agents, and viscosity modifiers;
   and wherein the mass ratio of component (c):component (a) is lower than 0.45.

3. The cementitious mixture according to claim 1, where the ratio component (d):component (a) is at least 3:20.

4. A method for manufacturing the cementitious mixture according to claim 1, comprising the steps of providing components (a) to (f) and optionally (g) to (i) and combining these components.

5. The method according to claim 4, wherein
   components (a), (b), (d), (e) and optionally (h) are combined to obtain a dry mixture;
   components (c), (f) and optionally (g) and (i) are combined to obtain a liquid mixture; and
   combining said dry mixture and said liquid mixture.

6. A concrete element comprising the components (a) to (f) and optionally (g) to (i) as defined in claim 1.

7. The concrete element according to claim 6 which is
not reinforced, or
passively reinforced, or
actively reinforced.

8. The concrete element according to claim 7 which is
passively reinforced with carbon-fiber reinforced polymer (CFRP) tendons in one or two dimensions; and
self-prestressed by the action of the concrete expansion; and
optionally curved in one or two dimensions.

9. A method for manufacturing a concrete element, comprising the steps of
(I) providing a cementitious mixture according to claim 1;
(II) optionally positioning reinforcing tendons;
(III) casting or pumping the cementitious mixture into moulds;
(IV) curing the cementitious mixture;
(V) demolding.

10. The method of claim 9, whereby
step (II) comprises positioning reinforcing tendons without external anchoring; and/or
step (III) is performed without compacting and/or without vibrating.

11. A concrete element obtained by the method of claim 9.

12. A method of making a self-prestressed reinforced concrete element, the method comprising:

I. providing a cementitious composition mixture according to claim 1;
II. pretensioning one or more CFRP tendons and installing the one or more CFRP tendons into moulds, wherein the tendons comprise carbon fibers, a matrix and a coating, wherein
   a. said fibers are embedded in said matrix and are selected from the group of high-modulus pitch-based or high-modulus PAN-based carbon fibers; and
   b. said matrix is selected from the group consisting of epoxy polymers; and
   c. said coating is located on the surface of said tendon and comprises quartz sand; and
   d. said tendon having a tensile strength between 1,000-2,500 MPa, and/or an axial elastic modulus of 400 GPa or more;
III. casting or pumping the cementitious mixture into the moulds; and
IV. curing the cementitious mixture; and
wherein the amount of CFRP tendons is between 0.1 to 10% in area ratio.

13. The method according to claim 12, wherein the concrete element is prestressed in more than one dimension, and wherein the amount of CFRP tendons in any direction may vary between 0.1 to 10% in area ratio.

* * * * *